Figure 1:
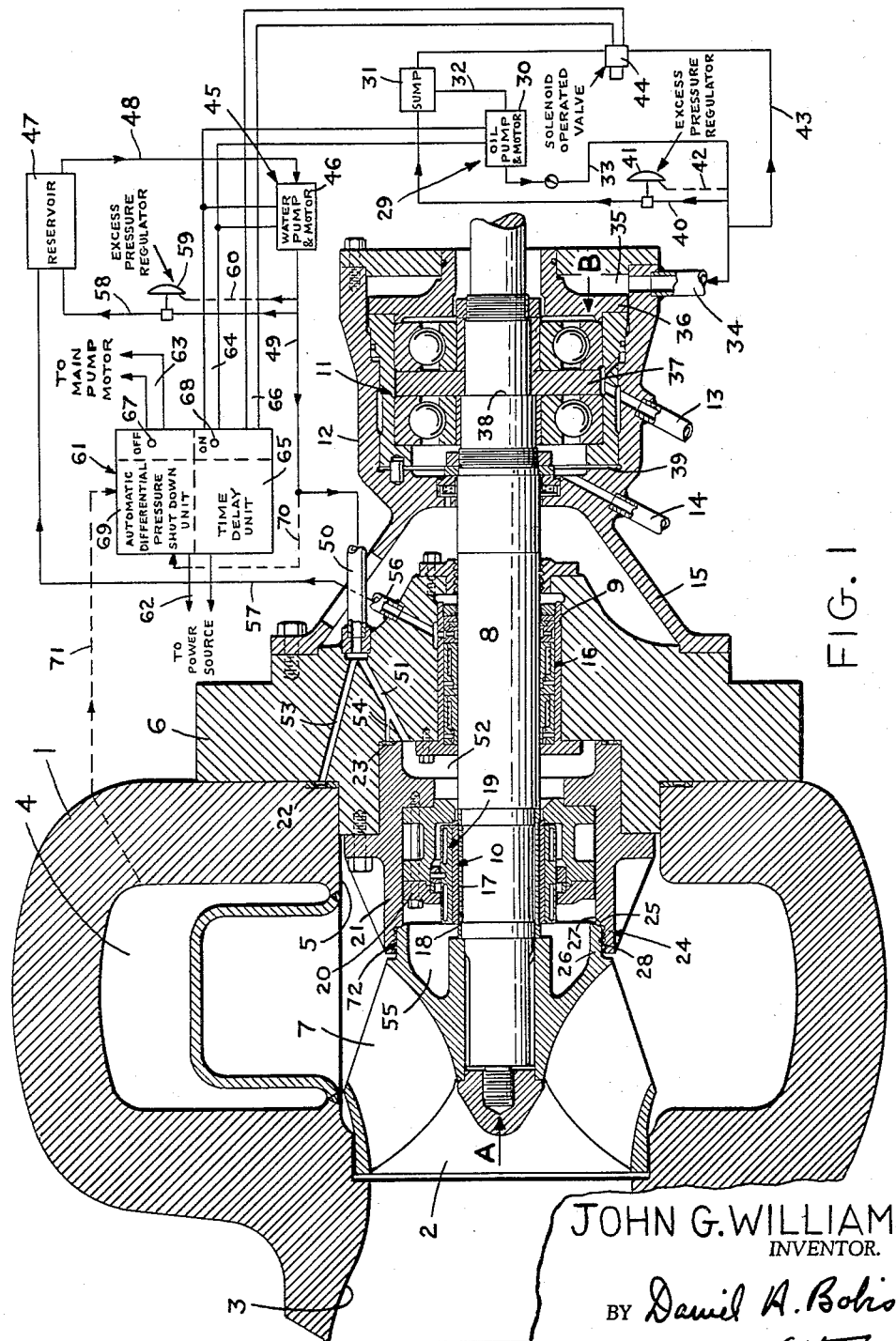

Nov. 22, 1960 J. G. WILLIAMS 2,960,938
SEALED CENTRIFUGAL PUMP
Filed March 7, 1958 2 Sheets-Sheet 2

JOHN G. WILLIAMS
INVENTOR.
BY Daniel A. Bohis
Atty

United States Patent Office 2,960,938
Patented Nov. 22, 1960

2,960,938

SEALED CENTRIFUGAL PUMP

John G. Williams, Springfield, N.J., assignor to Worthington Corporation, Harrison, N.J., a corporation of Delaware Filed Mar. 7, 1958, Ser. No. 719,770

4 Claims. (Cl. 103—111)

This invention generally relates to improvements for a centrifugal pump, these improvements more particularly having the effect of rendering the said pump leakproof during all phases of its operation to a degree heretofore unattainable.

The centrifugal pump of the present invention consequently is suitable for installations such as nuclear power plants having the most stringent leakage requirements. On the other hand, presently known centrifugal pumps cannot satisfy these requirements, and it is believed that this undoubtedly is due to a basic inability of the single seal characteristically provided in these pumps, such as a stuffing box and the like, to effectively prevent leakage during all phases of pump operation.

Thus to attain leakproof operation of a centrifugal pump, it is an object of the present invention to provide the said pump with a seal effective when the pump is not operating and with an additional seal effective when the pump is operating, the nature of these seals being such as to permit efficient and leakproof conversion from one to the other whenever the pump is either placed into or taken out of service.

More particularly, it is an object to provide as a seal effective when the pump is operating, one which can be applied prior to start-up of the pump or before the other seal is rendered ineffective, and which in addition can be maintained effective during shut-down of the pump or until the other seal is again effective.

As a further object, it is intended to provide the pump with a control sensitive to pressure conditions within the pump indicating imminent failure of the seal applied during pump operation and automatically operative to shut down the pump before such failure occurs, thus serving as a safety shut-down control for this said seal.

To accomplish these objects, the centrifugal pump of the present invention has a seal consisting of complementary sealing surfaces, one of which in one embodiment is provided on the rear face of the impeller and the other on the impeller chamber wall adjacent this face, and these sealing surfaces incident to an axial shifting of the shaft coact with each other to form a fluid-tight seal for the impeller chamber when the pump is not operating. When of necessity these sealing surfaces are parted to allow unimpeded rotation of the impeller and operation of the pump, the impeller chamber is then sealed by high pressure sealing fluid opposing leakage from the impeller chamber by being delivered into the impeller chamber between the parted sealing surfaces from behind the impeller. More particularly, delivery of the sealing fluid is started prior to start-up of the pump to thus be available as the sealing surfaces start to part, and is continued during pump shut-down or until the sealing surfaces again restore the fluid-tight seal to the impeller chamber. Thus the pump impeller chamber is effectively sealed while the pump is and is not operating, and during start-up and shut-down seal conversion periods.

Maintaining a centrifugal pump leakproof during all phases of operation by provision of the seals hereinabove mentioned will be better understood when considered in connection with accompanying specification and drawings forming a part thereof, in which:

Figure 1 has a longitudinal cross-sectional view of a centrifugal pump illustrating the construction and one preferred position for the seal effective when the pump is not operating, and also a diagrammatic representation of the equipment used in combination with the pump providing the seal effective when the pump is operating and enabling efficient conversion from one seal to the other.

Figure 2:
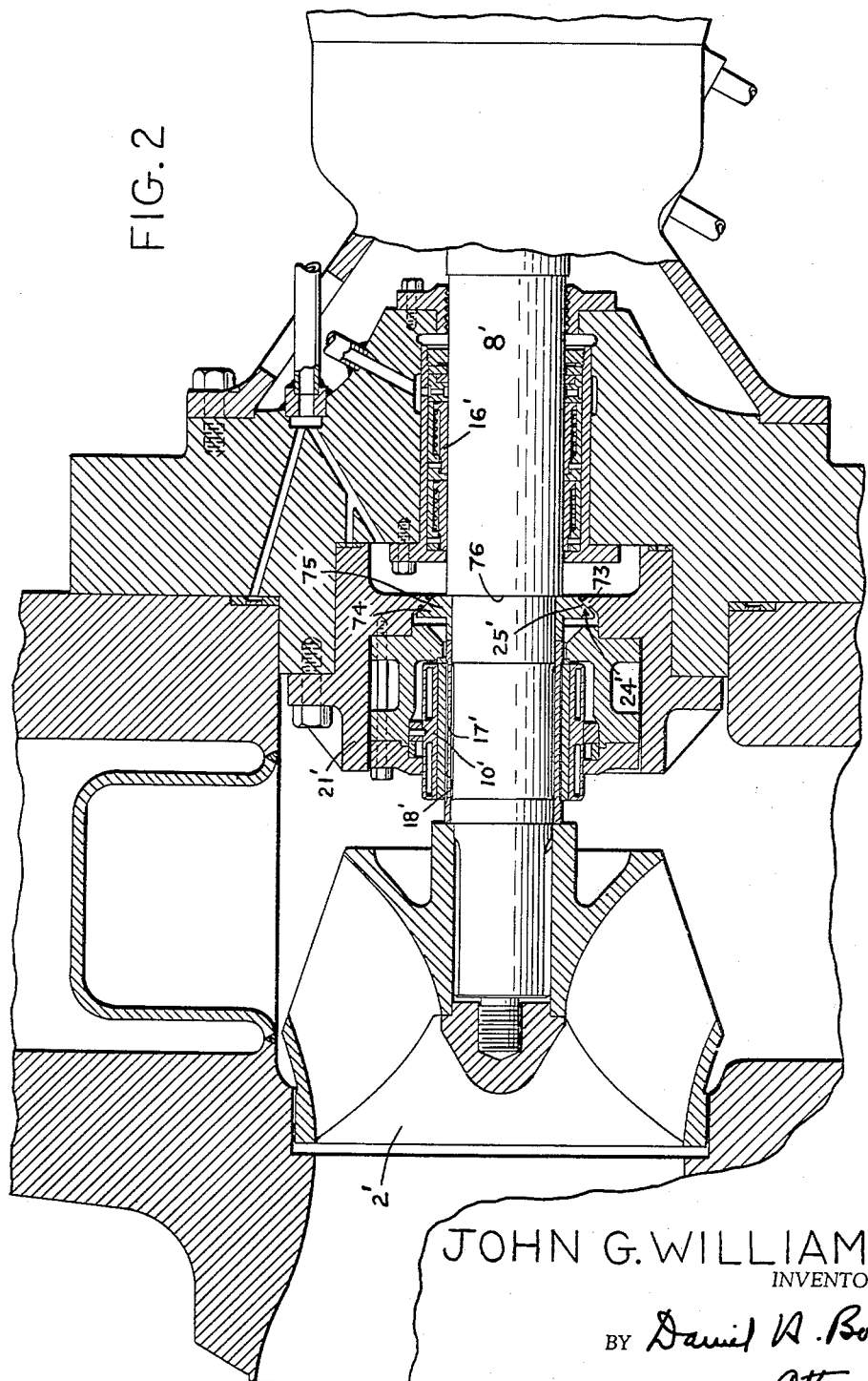

Figure 2 is a view of a centrifugal pump similar to that shown in Figure 1 illustrating another preferred position for the seal effective when the pump is not operating.

*The pump*

The pump shown in Figure 1 is conventional in most respects, having a housing 1, an impeller chamber 2 and an impeller chamber inlet 3 and outlet 4 formed in said housing 1, a housing axial opening 5 opposite said inlet 3, a closure 6 for the impeller chamber 2 connected to the housing 1 about said axial opening 5, and an impeller 7 in said impeller chamber 2 rotatably mounted on the end of a shaft 8 extending into the impeller chamber 2 through the housing axial opening 5 and a coaxial opening 9 in the closure 6. The bearing supports for the shaft 8 consist of a sleeve bearing 10 disposed adjacent the impeller 7, and side by side disposed ball bearing units 11 spaced an appropriate distance from the sleeve bearing 10. The ball bearing units 11 are encased in a bearing casing 12 having a lubrication inlet 13 and outlet 14 connection, and a conical extension 15 connected at one end to the closure 6 for support. Disposed about the shaft 8 in the axial opening 9 of the closure 6 is a conventional pressure breakdown device 16 whose function will soon be apparent.

The sleeve bearing 10 situated adjacent the impeller 7 is also of conventional design, having a rotor element 17 rotating with the shaft 8 within the axial bore 18 of a bearing housing 19 held stationary by an inner bearing mounting element 20 suitably connected to it and to an outer bearing mounting element 21 connected to the closure 6.

*The sealing surfaces seal*

The position of impeller 7 shown in Figure 1 is the position it assumes when the pump is not operating, that is, when the impeller 7 is not being rotated to pump the fluid entering the impeller chamber 2 through the inlet 3. Sealing the impeller chamber 2 at this time are conventional seals such as packing ring arrangements 22 and 23 in the locations shown, and also an effective fluid-tight seal, generally designated 24, which prevents the leakage of fluid past the impeller 7 and out of the impeller chamber 2 through the housing axial opening 5.

This seal 24 is formed by the sealing engagement of complementary annular sealing surfaces 25, one of which is machined at the end of a cylindrical extension 26 from the rear face of impeller 7, and the other of which is machined in a shoulder 27 in a counterbore 28 in the end of the outer bearing mounting element 21 extending past the sleeve bearing 10 in the direction of the impeller 7. Under the pressure of the fluid in the impeller chamber 2 acting on the front face of the impeller 7, the said impeller and thus its extension 26 disposed within the counterbore 28 is biased in the direction of the arrow A, thus bringing the sealing surfaces 25 into sealing engagement with each other forming the said fluid-tight seal 24 sealing the impeller chamber 2 when the pump is not operating.

The shaft shifting-means

To place the pump into service, it is necessary to part the sealing surfaces 25 to permit unimpeded rotation of the impeller 7. Accordingly, a hydraulic means 29 of conventional design is provided to supply oil or other fluid at a sufficiently high pressure to shift the shaft 8 and impeller 7 mounted thereon axially in the direction of arow B. Shaft 8 need only be shifted a slight distance, which distance will be understood to be within the limits of axial play normally occurring in a conventional coupling (not shown) connecting shaft 8 to a suitable driving motor (not shown).

More particularly, hydraulic means 29 has an oil pump and motor assembly 30 which receives oil from a sump 31 through a line 32 and pumps this oil at high pressure through an outlet line 33 connected to an inlet connection 34 of an annular pressure chamber 35 formed in the ball bearing casing 12. The oil in the pressure chamber 35 exerts pressure on a pressure plate 36 biasing this said plate in the direction of arow B. The movement thus imparted to this plate is transmitted to the shaft 8 through a second pressure plate 37 disposed about the shaft 8 and bearing against a shoulder 38 machined in the said shaft. As previously stated, this movement is very slight, in the order of about .03 inch, thus axial clearance within which movement can occur within the bearing casing 12 is limited to this distance as indicated at 39.

The hydraulic means 29 also includes conventional means for relieving excess pressure in the outlet line 33 and means for relieving the pressure in this line entirely, thus causing the pressure in the pressure chamber 35 to drop drastically allowing shaft 8 to return to the position it occupied before being shifted. The excess pressure relieving means consists of a tap-off line 40 from the outlet line 33 to the sump 31 and a normally closed diaphragm valve 41 in this said line, which valve opens allowing some of the oil from the outlet line 33 to return to the sump 31 whenever the pressure in the said outlet line 33 transmitted to the said valve 41 through a sensing line 42 exceeds a predetermined value. The total pressure relieving means also consists of a tap-off line 43 from the outlet line 33 to the sump 31 and a normally closed valve 44 in this said line. However, the valve 44 is a solenoid operated valve opened by an electrical signal, and when open having the effect of diverting a sufficient quantity of the oil being delivered through the outlet line 33 from the pressure chamber 35 into the sump 31 to thus cause a pronounced pressure drop in the pressure chamber 35. Thus to move the shaft 8 from its shifted position to its position shown in Figure 1, it is necessary only to open the normally closed solenoid operated valve 44.

The sealing fluid seal

When shaft 8 is shifted to place the pump into service, the fluid-tight seal 24 no longer is effective and thus must be replaced by another seal if leakage from the impeller chamber 2 is to be prevented. This additional seal, according to the present invention, consists of a high pressure sealing fluid, such as water, delivered between the parted sealing surfaces 25 into the impeller chamber 2 and by this direction of flow opposing leakage out of the impeller chamber 2 during operation of the pump.

The means, generally designated 45, supplying this high pressure sealing fluid is similar in many respects to the hydraulic means 29, having a high pressure water pump and motor assembly 46 which receives water from a reservoir 47 through a line 48 and pumps this water at high pressure through an outlet line 49 connected to an inlet connection 50 in the rear face of closure 6. Most of this pumped water passes from the inlet connection 50 through a passageway 51 in the closure 6 emptying into an annular chamber 52, while some is diverted through the passageways 53 and 54 to the packing ring arrangements 22 and 23 to enhance the sealing ability of these arrangements.

With the pump out of service, the sealing fluid emptying into the annular chamber 52 first flows to the left along the shaft 8 through the running clearance of the sleeve bearing 10 into a second annular chamber 55 situated adjacent the rear face of the impeller 7, and not being able to continue in this direction, is then forced to back up to the right flowing through the pressure break-down device 16 and leaving this said device at a reduced pressure through an outlet connection 56 to return to the reservoir 47 through a suitable return line 57. However, when the pump is placed into service and the sealing surfaces 25 parted by the hydraulic means 29, the path of least resistance for the sealing fluid flowing from annular chamber 52 into annular chamber 55 is from chamber 55 into the impeller chamber 2 between the parted sealing surfaces 25. Flowing in this direction into the impeller chamber 2, the sealing fluid thus opposes leakage out of the said impeller chamber 2, maintaining the pump leakproof during the time it is placed into and kept in service and while the sealing surfaces 25 are being parted and held apart.

Like the hydraulic means 29, the means 45 supplying the sealing fluid also has a conventional arrangement consisting of a tap-off line 58, a normally closed diaphragm valve 59 in this said line, and a pressure sensing line 60 connection to this said valve for relieving any excess pressure in the outlet line 49 exceeding a predetermined value.

Start-up and shut-down controls

In order to prevent damage to the sealing surfaces 25 and to prevent leakage from the impeller chamber 2 during pump start-up and shut-down, it is necessary that these operations be accomplished according to the sequence of steps now to be described.

To start up the pump, the oil pump and motor assembly 30 and the water pump and motor assembly 46 must each first be started to part the sealing surfaces 25 allowing unimpeded rotation of impeller 7, and to insure that sealing fluid is available as the sealing surfaces 25 start to part to seal impeller chamber 2, and then afterwards the pump motor may be started. Both the assemblies 30 and 46 in this connection may be started simultaneously inasmuch as assembly 46 will supply sealing fluid to the chamber 55 adjacent the impeller 7 before assembly 30 can cause a sufficient build-up of pressure in the pressure chamber 35 to actually shift the shaft 8 and part the sealing surfaces 25.

To shut-down the pump, the reverse sequence of steps is necessary, that is, the pump motor must first be stopped to allow the impeller 7 to come to rest, and afterwards the operation of the assemblies 30 and 46 stopped and the valve 44 opened. Here too, both assemblies 30 and 46 may be stopped and valve 44 opened simultaneously, inasmuch as the effect produced by opening the said valve, namely, to cause the shaft 8 to shift back to the position restoring the fluid-tight seal 24 to impeller chamber 2, occurs before assembly 46 comes to rest and ceases to supply sealing fluid. In other words, although the operation of assembly 46 is stopped simultaneously with the operation of assembly 30 and the opening of valve 44, sealing fluid is nevertheless supplied by assembly 46 to seal impeller chamber 2 during the time the fluid-tight seal 24 is being restored and until this restoration is completed.

To effectuate pump start-up and shut-down in the sequence of steps just described, a manually operated control unit, generally designated 61 and understood to be of conventional design, is provided as accessory equipment for the pump. This control 61 has a suitable circuit 62 connected to a power source, circuits 63 and 64 connected to the pump motor and assemblies 30 and 46 respectively, a time delay unit 65, a circuit 66 connected to the solenoid operated valve 44 through which a signal can be transmitted to open the said valve, and at least two manual circuit switches, one being an "off" button 67 and the other an "on" button 68. Depressing the "on" button 68 will be understood to first close circuit 64 starting operation of assemblies 30 and 46, and after a time delay controlled by the time delay unit 65 close circuit 63 starting operation of the pump motor. Subsequently depressing the "off" button 67 will be understood to open circuit 63 stopping operation of the pump motor, and after a time delay also controlled by the time delay unit 65 simultaneously open circuit 64 and close circuit 66 thus stopping operation of assemblies 30 and 46 and opening valve 44 respectively.

In addition to the manually operated "off" button 67 for shutting down the pump, control 61 is provided with a conventional pressure differential unit 69 for automatic pump shut-down in response to pressure conditions within the pump indicating imminent loss of the effectiveness of the sealing fluid supplied during pump operation to seal the impeller chamber 2. The sealing fluid will of course lose its effectiveness if at any time its pressure is reduced below that of the fluid being pumped, which may occur if the water pump or motor of assembly 46, or the pressure breakdown device 16 should for any reason fail. Accordingly, the pressure of the sealing fluid being delivered through the outlet line 49 is transmitted through a sensing line 70 to the pressure differential unit 69 for comparison with the pressure of the fluid being pumped also transmittted to this said unit through a sensing line 71, and whenever the former pressure does not exceed the latter pressure by a predetermined margin, the said pressure differential unit 69 will be understood to automatically set into operation the same sequence of steps that is accomplished by depressing the "off" button 67 thus causing the pump to shut down.

*Operation*

To illustrate the leakproof operation of the centrifugal pump of the present invention shown in Figure 1, let it be assumed that the said pump had been in service and thus has fluid in its impeller chamber 2. At this time this fluid is prevented from leaking out of the impeller chamber 2 by the fluid-tight seal 24 formed by the sealing surfaces 25. To put the pump into service, the "on" button 68 of control 61 is depressed starting operation of assemblies 30 and 46, the former supplying high pressure sealing fluid to the chamber 55 while the latter initiates a pressure build-up in the pressure chamber 35. Eventually there is a sufficient pressure build-up in pressure chamber 35 to shift shaft 8 and impeller 7 mounted thereon a slight distance in the direction of arrow B to part the sealing surfaces 25. During this time, however, the sealing fluid flows from chamber 55 into impeller chamber 2 between the parting sealing surfaces 25 preventing leakage out of the impeller chamber 2. Aiding the sealing fluid is a conventional labyrinth seal 72 which also opposes leakage out of impeller chamber 2. When the axial shift of shaft 8 to the left has been completed, which usually takes approximately 15 seconds, the pump motor is started and impeller 7 rotated to start the actual pumping operation of the pump, during which time the sealing fluid is continuously supplied to seal the pump impeller chamber 2.

To take the pump out of service, the "off" button 67 of control 61 is depressed stopping operation of the pump motor and allowing impeller 7 to come to rest, which also has been found to usually take 15 seconds. After this period of time has elapsed, the operation of assemblies 30 and 46 are stopped and valve 44 of the hydraulic means 29 opened, which then causes shaft 8 and impeller 7 to assume their original position relative to the pump housing 1 which restores the fluid-tight seal 24 to the impeller chamber 2. As indicated, the effect produced by opening valve 44 restoring the said seal 24 to the impeller chamber 2 occurs before assembly 46 actually comes to rest, with the result that sealing fluid is supplied by this said assembly sealing the impeller chamber 2 until completion of the restoration of the said fluid-tight seal 24 to the impeller chamber 2.

Thus the pump impeller chamber 2 is effectively sealed against leakage when the pump is and is not operating, and during pump start-up and shutdown periods. In addition, should pressure conditions sensed by the pressure differential unit 69 of control 61 indicate imminent loss of the effectiveness of the sealing fluid supplied during pump operation, this said unit will cause automatic shut-down of the pump before leakage from the pump can occur.

*Modified sealing surfaces seal*

The pump shown in Figure 2 is similar in most respects to the pump shown in Figure 1, the similar component parts of each being denoted by the same but primed numerals However, it is contemplated that this pump will be utilized to pump fluids having a high initial pressure when delivered into the impeller chamber 2', which referring to Figure 1, thus requires either making the overlapping extensions of impeller 7 and the outer bearing mounting element 21 of sufficient width to withstand this pressure, or modifying the pump as indicated in Figure 2. The latter solution is preferred when the pressure of the fluid to be pumped is about 2000 p.s.i.

Accordingly, in this modified form of the pump shown in Figure 2, the modifications consist of the elimination of the previously referred to overlapping extensions within the impeller chamber 2', and the relocation of the fluid-tight seal 24' between the sleeve bearing 10' and the pressure breakdown device 16'. The seal 24' is likewise comprised of complementary annular sealing surfaces 25', but in this instance, one surface is machined in a projection 73 on the outer bearing mounting element 21', and the other surface machined in an upright portion 74 of an L-shaped ring 75 rigidly disposed on the shaft 8' between the rotor element 17' of the sleeve bearing 10' and a shoulder 76 machined in the shaft 8'.

Except for the above modifications in the construction and location of the fluid-tight seal 24', it will be understood that the pump shown in Figure 2 and that shown in Figure 1 operate similarly, and that the pump shown in Figure 2 is maintained leakproof during all phases of its operation in the same manner that has been described in connection with the pump shown in Figure 1.

It will be further understood that neither of the said pumps hereinabove described are to be limited to the specific construction or arrangement of parts shown, but that they may be widely modified within the invention as defined by the claims.

What is claimed is:

1. A centrifugal pump including a housing having inlet and outlet connections and an impeller chamber therein, an impeller in said impeller chamber mounted on a driven rotatable shaft axially shiftable within the limits of play normally occurring in the drive connection of said shaft, and means preventing leakage from said impeller chamber comprising, in combination: complementary annular sealing surfaces on the rear face of the impeller and on the wall of the impeller chamber adjacent this face adapted to coact with each other to seal the impeller chamber incident to an axial shifting of the shaft; hydraulic means operatively connected to said shaft to shift said shaft parting said sealing surfaces and allowing unimpeded rotation of the impeller, said hydraulic means including a normally closed solenoid operated valve which when opened permits said shaft to return to its original position; means having a fluid connection to said sealing surfaces and operative when said shaft is being shifted to deliver high pressure sealing fluid to said sealing surfaces for passage between said parting sealing surfaces into said impeller chamber opposing leakage therefrom; and a shutdown control operatively connected to a prime mover causing rotation of the shaft and to the said normally closed solenoid operated valve to stop the rotation of the shaft and thereafter open said normally closed solenoid operated valve shutting down the pump.

2. The combination as claimed in claim 1 including sensing means for said shut-down control connected to sense the pump discharge pressure and the pressure of the sealing fluid, said shut-down control being automatically operative to open the normally closed solenoid operated valve whenever the differential between these said pressures is less than a predetermined value.

3. A centrifugal pump including a housing having inlet and outlet connections and an impeller chamber therein, an impeller in said impeller chamber mounted on a driven rotatable shaft axially shiftable within the limits of play normally occurring in the drive connection of said shaft, and means preventing leakage of fluid from said impeller chamber inwardly along said shaft comprising, in combination: complementary annular sealing surfaces on an element rigidly disposed on said shaft spaced inwardly of the impeller and on the pump housing concentric to said element, said sealing surfaces coacting with each other incident to an axial shifting of the shaft forming a seal preventing leakage down along the shaft; hydraulic means operatively connected to said shaft to shift said shaft parting said sealing surfaces and allowing unimpeded rotation of the shaft, said hydraulic means including a normally closed solenoid operated valve which when opened permits said shaft to return to its original position; means having a fluid connection to said sealing surfaces and operative when said shaft is being shifted to deliver high pressure sealing fluid to said sealing surfaces for passage between said parting sealing surfaces in the direction of said impeller chamber opposing leakage in the opposite direction between said sealing surfaces; and a shut-down control operatively connected to a prime mover causing rotation of the shaft and to the said normally closed solenoid operated valve to stop the rotation of the shaft and thereafter open the said normally closed solenoid operated valve shutting down the pump.

4. The combination as claimed in claim 3 including sensing means for said shut-down control connected to sense the pump discharge pressure and the pressure of the sealing fluid, said shut-down control being automatically operative to open the normally closed solenoid operated valve whenever the differential between these said pressures is less than a predetermined value.

References Cited in the file of this patent

UNITED STATES PATENTS

| 2,441,708 | Luaces et al. | May 18, 1948 |

FOREIGN PATENTS

| 582,365 | France | Oct. 13, 1924 |